July 26, 1932.  B. BRONSON ET AL  1,869,333
METHOD OF MAKING STEERING WHEEL INSERTS
Filed Nov. 18, 1929  4 Sheets-Sheet 2
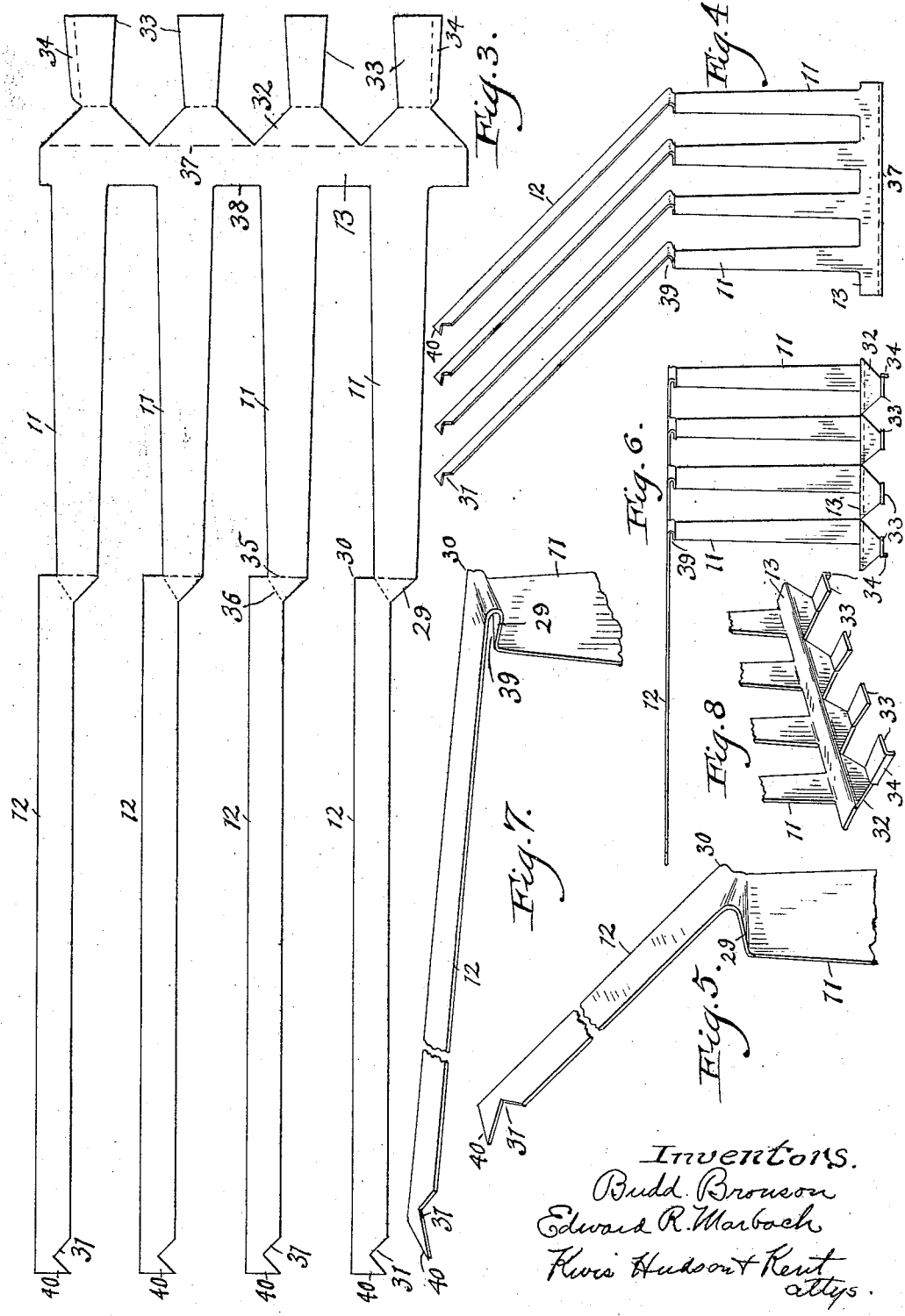

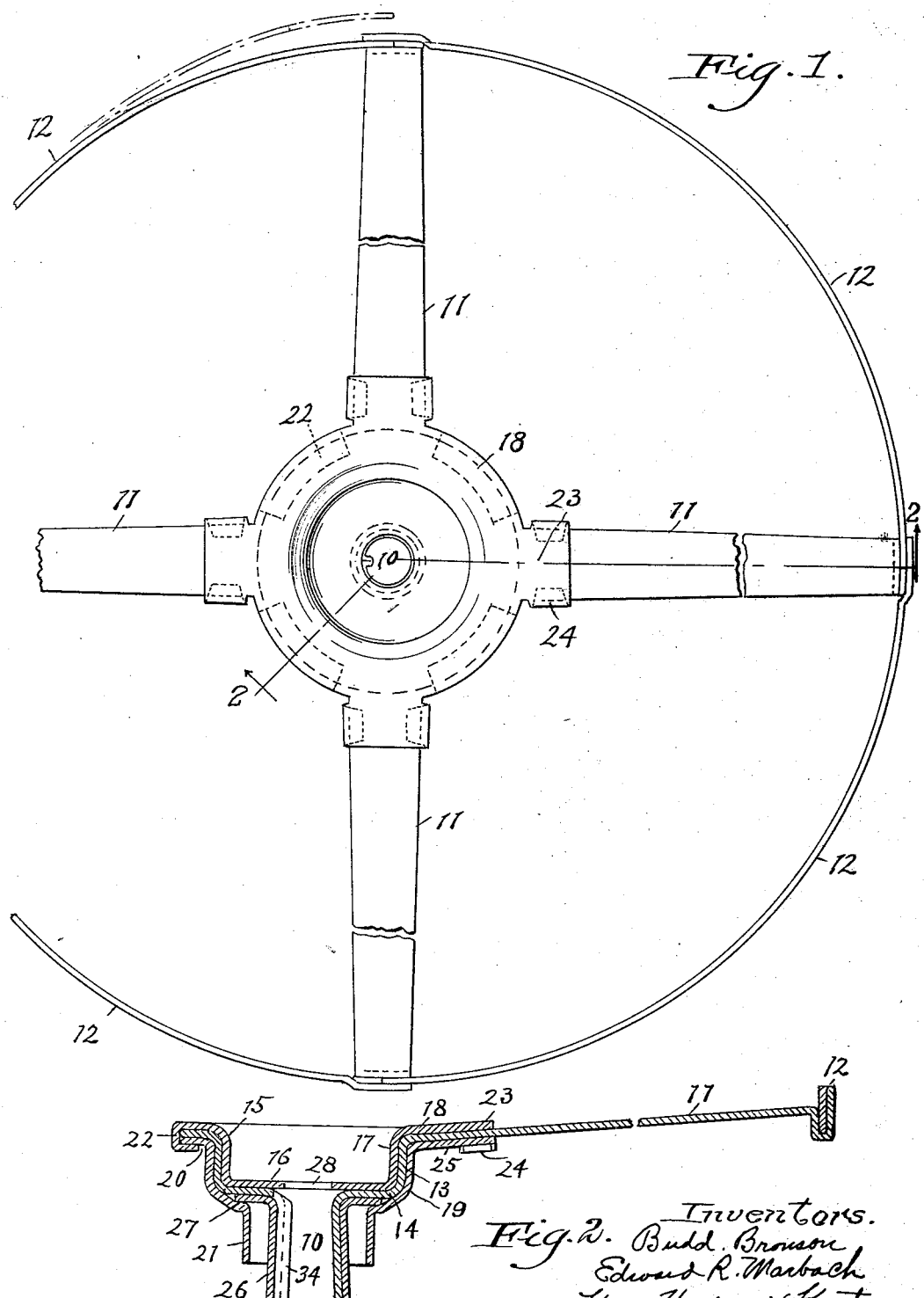

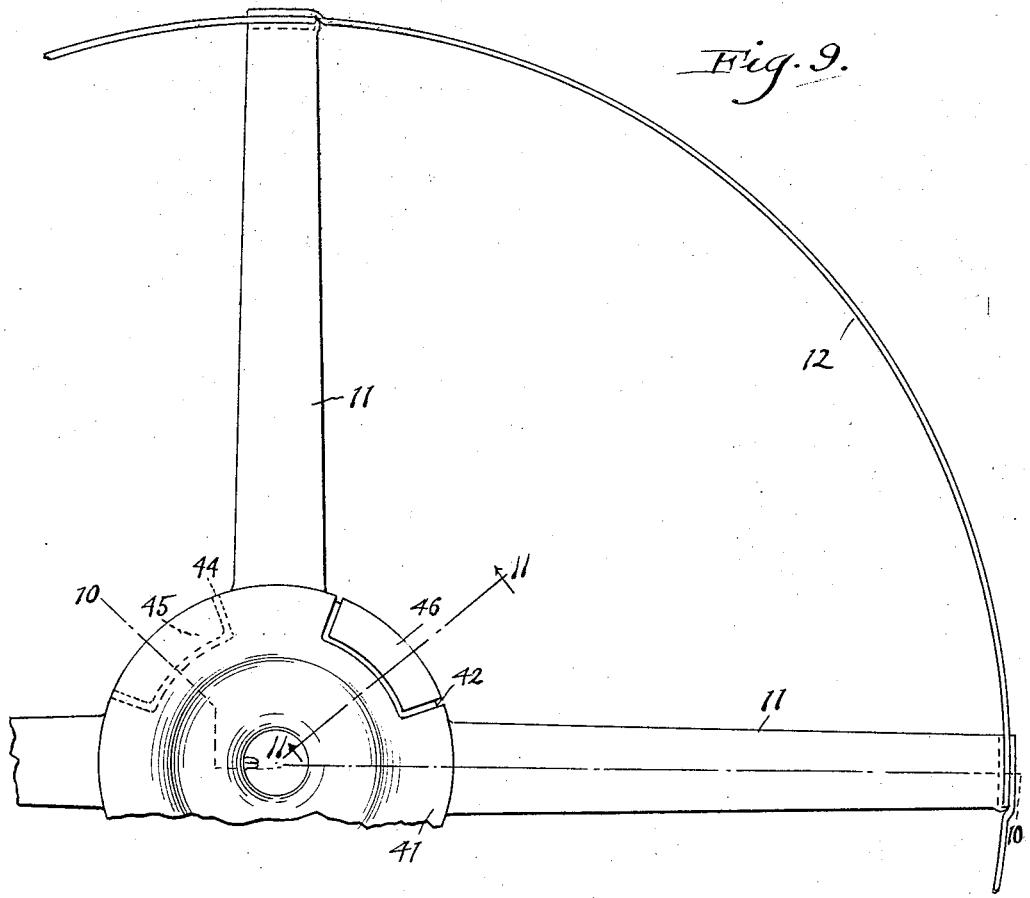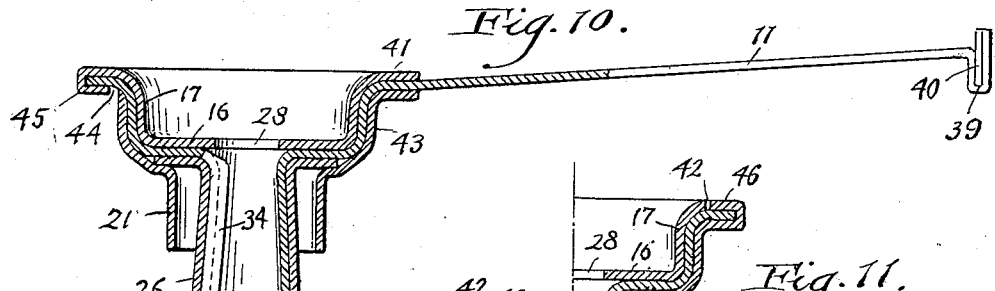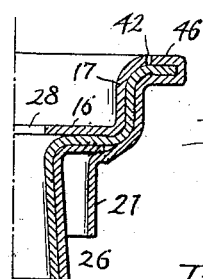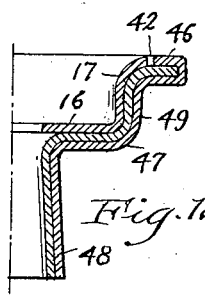

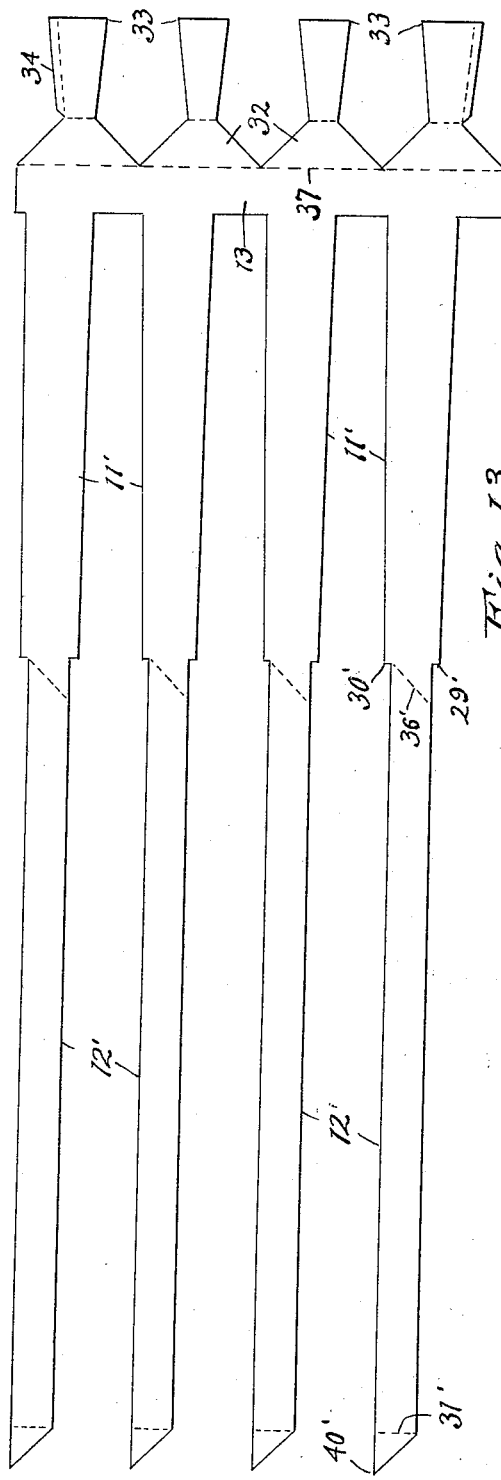
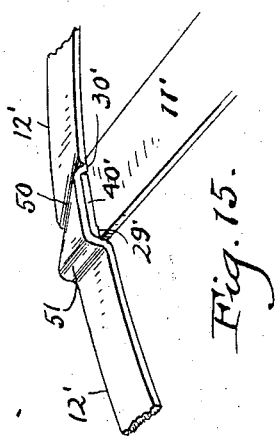

Patented July 26, 1932

1,869,333

UNITED STATES PATENT OFFICE

BUDD BRONSON AND EDWARD R. MARBACH, OF CLEVELAND, OHIO, ASSIGNORS TO THE OHIO RUBBER COMPANY, OF CLEVELAND, OHIO, A CORPORATION OF OHIO

METHOD OF MAKING STEERING WHEEL INSERTS

Application filed November 18, 1929. Serial No. 407,984.

This invention relates to steering wheels of the type comprising a metallic insert built up largely of sheet metal stampings and generally covered with non-metallic surfacing material, and more particularly to the sheet metal insert and methods of constructing the same.

Metallic inserts heretofore provided have comprised a heavy core of cast or forged material, about which the remaining portions of the insert have been built up from a large number of parts and by a large number of operations. This core has been the source of several difficulties. Being of a different manufacture, the core must be constructed separately and hence offers great opportunity for delays in production. Furthermore, the construction of the core, whether cast or forged, is comparatively expensive.

It is therefore an object of the present invention to avoid the difficulties inherent in the core construction referred to above and, in short, to provide a coreless construction.

It is obviously desirable to construct the insert of as few pieces as possible. If the metallic insert, including the hub, spokes and continuous rim, were to be stamped from sheet metal, this operation would result in a prohibitive amount of scrap, inasmuch as the area removed between the spokes would be substantially as great as the remaining portions of the insert. It is therefore a further object of the invention to provide an insert comprising hub, spokes and rim formed from a single sheet metal stamping with a minimum amount of scrap.

Other objects and features of novelty will be apparent as the following description proceeds, as read in conjunction with the accompanying drawings, in which—

Fig. 1 is a plan of the completed insert for a steering wheel, according to the present invention;

Fig. 2 is a section at the line 2—2 of Fig. 1;

Fig. 3 is a plan of a sheet metal blank from which the insert is to be formed;

Fig. 4 is a plan of the blank in a latter stage;

Fig. 5 is an enlarged detail showing the folding;

Fig. 6 is a plan of the blank in a further stage.

Fig. 7 is a detail showing further folding;

Fig. 8 is a perspective of the cup portion;

Fig. 9 is a plan of a modified form;

Fig. 10 is a section along the line 10—10 of Fig. 9;

Fig. 11 is a section along the line 11—11 of Fig. 9;

Fig. 12 is a modified section similar to Fig. 10;

Fig. 13 is a plan of a modified blank;

Fig. 14 is a detail of the modified folding; and

Fig. 15 is a detail of further folding.

Referring more particularly to the drawings, the steering wheel insert, according to the present invention, comprises essentially a hub 10, a plurality of spokes or spider arms 11, and a rim made up of a plurality of sections 12. The spokes 11 are integral with the hub 10, and the sections 12 are integral with the outer end of the spokes 11. All of these parts are stamped from sheet metal.

The hub 10 and the spokes 11 constitute parts of a spider member, which has a central cupped portion comprising an annular flange 13 and a radial flange 14. A top plate 15 stamped from sheet metal is pressed down inside the cup portion of the spider and comprises a disk-like bottom portion 16 and a cylindrical side wall 17 from which projects a radial flange 18.

A bottom plate 19 also stamped from sheet metal is pressed up over the cup portion of the spider and is provided with a radial flange 20 corresponding to the flange 18 of the top plate, and a depending cylindrical flange 21 adapted to overlie the steering mast of the motor vehicle upon which the steering wheel is to be mounted. The top plate 15 is provided with a plurality of projections 22 located intermediate the spokes 11 and adapted to be bent down over the spider and under the bottom plate 19, as shown in Fig. 2, to secure the parts in position.

The flange 18 also carries projections 23, one for each of the spokes 11, and slightly greater in width, forming tabs 24 which are bent down therearound, enveloping projections 25 extending outwardly from the bottom plate 19 in alignment with each of the spokes.

The hub 10 is surrounded by a collar 26 which is tapered to correspond to the tapered end of the steering shaft upon which the hub is to be mounted. The upper end of the collar 26 is provided with a radial flange 27 which underlies the flat portion 14 of the spider. The plate 16 is provided with a central aperture 28 which may receive the upper end of the steering shaft, or provide access therethrough for electrical conductors to the horn button switch mounted centrally of a steering wheel.

The sheet metal insert described above is very simple and inexpensive in construction and of sufficient strength and durability for the purpose desired. This insert may be constructed by a novel method now to be described as constituting an important part of the present invention.

Fig. 3 shows an integral blank from which the entire insert may be formed, and which may be stamped from a sheet of metal by a single operation. The band 13, spokes 11 and rim portions 12 are given the same reference characters as these parts have in Figs. 1 and 2. It will be noted that the band 13 is disposed transversely of the blank and that the portions 11 and 12 constitute integral strips projecting therefrom. In the form shown the portions 12 are offset with respect to the portions 11, resulting in an inclined edge 29 and an angular shoulder 30. The outer end of each portion 12 is notched as at 31, for a purpose which will hereinafter appear.

Depending from the band 13 are a plurality of trapezoidal portions 32 which are to be mitered together to form the bottom 14 of the cup portion of the spider. Integral with the portions 32 are a pluraltiy of elongated trapezoidal portions 33 which are of increased width at their extreme ends and are adapted to be brought together to form the hub 10. The two outer portions 33 are each provided at their outer edges with a tab 34, these tabs being adapted to be turned inwardly and brought together to form the key by which the hub is secured to the end of the steering shaft.

In shaping the blank into the form of the insert described, the strip portions of the blank are folded so as to divide the rim portions 12 from the spoke portions 11. Accordingly the outer ends are folded up, the line of the fold being indicated by the dotted line 35, and then folded downwardly, this line of fold being indicated by the dotted line 36. The other end of the blank will be folded downwardly, as indicated by the dotted line 37. These operations will give the blank the appearance illustrated in Fig. 4, the folding of the strips being illustrated in Fig. 5. The folding of the strips is then completed, and the bottom portion of the blank is bent up along the edge 38 of the band 13, thus disposing the band at right angles to the spokes 11, bringing the blank into the form shown in Fig. 6, the tabs 34 being bent perpendicular to the projections 33 at any convenient intermediate stage of the process. These steps result in the formation shown in Fig. 8.

The band 13 is now rolled into the form of a tube or cylinder by pressing its ends together, which will cause the portions 32 to miter together to form the bottom 14 of the cup of the spider, and the portions 33 will be brought together to form the hub 10. In the rolling operation the metal of the portions 32 will, of course, be slightly deformed in order to give a true cylindrical contour to the band 13, and in this rolling operation the flat projections 33 will be given the desired conical contour.

After this rolling operation the blank will have the general appearance of a swastika. It should be noted that the folding of the rim portions 12 with respect to the spoke portions 11 will leave a substantially triangular pocket 39. Hence, to complete the rim for the insert, it is only necessary to insert the tip 40 beyond the notch 31 in the pocket 39 of the next rim and spoke portion. The metal of the portions 12 should be permanently curved in order to retain them in the desired position, after which the completed rim may be given any desired cross-section.

The collar 26 is fitted over the hub portions 33, with its flange abutting the mitered portions 32 and the collar and hub portions are rolled into a common conical contour. The bottom cover plate 19 is pressed up over the flange 27 of the collar, and firmly pressed over the outside of the band 13. The top cover plate is pressed over the cupped portion of the spider, with the bottom 16 overlying the mitered portions 32, and with the flange 17 snugly fitting inside the band 13. The flange 18 overlies the spokes, and the projections 22 thereof are folded down therebetween under the flange 20, preferably while the plates 15 and 19 are under pressure against the cup portion of the spider. The tabs 24 of the projections 23 from the flange 18 are preferably bent down around the spokes and under the projections 25 from the bottom plate, also at the same time and by the same operation. However, the collar 26, and the plates 15 and 19 may be applied by separate operations, and the tabs 22 and 24 also be bent down separately if desired.

The method described above enables the insert to be formed from a blank which may be cut from sheet metal with a minimum amount of scrap and shaped into the desired form by a minimum number of operations. Several, if not all, of the folding and rolling operations may be performed by one operation of a press.

For the purpose of strengthening the insert, the spokes and rim may be corrugated, flanged, crimped, rolled, or otherwise operated upon to increase the moment of inertia of their sections. This strengthening of the spokes may take place at any desired point in the process, such as during the stamping of the blank. However, as the rim portions must be curved in order to fit together to form the complete rim, this strengthening operation will be performed upon the rim after the completed rim is formed. It should be noted that this operation will serve to anchor the tips 40 in the notches 39 even more securely. It is preferred that the spokes be strengthened also after the complete rim has been formed.

It is not essential to the invention that the top plate 15 be secured to the bottom plate 19. As shown in the modified forms of Figs. 9, 10, 11 and 12, the top plate and the bottom plate may be independently secured to the spider. Accordingly, a top plate 41 is notched out as at 42 between adjacent spokes at diametrically opposite portions, and the bottom plate 43 is similarly notched at 44 at a position 90° from the notches 42. The top plate 41 has integral tabs or flaps 45 which are bent down over the spider and folded up thereunder to lie within the notch 44 in the bottom plate. Similarly, the bottom plate 43 carries flaps 46 which are bent up over the spider, and then folded down thereover, to lie within the notches 42. This construction is otherwise similar to that of Fig. 1, with the exception that the projections 23, tabs 24 and projections 25 are omitted.

As a further modification, the bottom plate may be integral with the collar, as shown in Fig. 12. A single stamping 47 has an integral collar portion 48 and an integral spider cover portion 49 with which the flaps 46 are integral. It should be noted that after one blank such as shown in Fig. 3 has been cut from the sheet metal stock, the portions 11—12 of a second blank may be cut from the metal remaining projecting from the stock sheet, which metal was cut from between the corresponding portions of the first blank. In other words, the strips of one blank may lie between the strips of the next. Similarly, the portions 33 of one blank, may lie between the corresponding portions of a further blank. In this manner the scrap metal is reduced to a minimum.

In any of these forms, the cupped formation of the center of the insert is not essential and if the same is not desired, the structure and steps necessary for the construction thereof may be omitted.

Accordingly, the same blank may be used, or the band portion of the blank may be made more narrow, being only of sufficient width to form a flange connecting the spokes. Then in forming the insert therefrom, the folding of the spokes at the edge 38 is omitted. The band is rolled into a flat annulus, rather than a tube. This will necessitate some deformation or stretching of the metal of the band, but any suitable sheet metal will permit this step.

In this manner the portions 32 will form a flat disk surrounded by an integral band in the same plane, from which the spokes project integrally also in substantially the same plane.

The top plates 15 or 41 will be flat, when the cupped construction is omitted, and the bottom plates 19, 43 or 47 will also be flat, except for the depending cylindrical flange of each of these forms. The cupped central portion may be correspondingly omitted with the further modification hereinafter described.

A modified blank is shown in Fig. 13. The band 13 and the portions 32, 33 and 34 are identical with those described in connection with Fig. 3 and are offset and rolled in the same manner. The rim portions 12, however, are more nearly aligned with the spoke portions 11′, shoulders 29′ and 30′ being formed by the reduced width of the rim portions. Also, the outer end of each rim portion is mitered off, forming a pointed end 40′.

With this form as shown in Fig. 14 the rim portions 12′ are folded only once, along a 45° line 36′ which disposes the rim portions at right angles to the spokes. The tips 40′ are folded along a line 31′ so as to form a sort of flat hook. This hook is fitted in the pocket 39′ formed by the fold at 36′ in the adjacent rim portion, and at the same time engaging the shoulder 29′ of the spoke integral therewith. The rim portions are now crimped or stamped as shown in Fig. 15 to form the crease 50, which causes the rim portion to engage the shoulder 30′, and the crease 51 which locks the tip 40′ in the pocket 39′ and also engages the shoulder 29′.

When the insert has been formed as herein described, all that is necessary to complete the steering wheel is to cover the rim and such portions of the spokes and hub as may be desired, with suitable non-metallic surfacing material, preferably rubber.

While some embodiments of the invention have been illustrated and described in great detail, for the purposes of adequate disclosure, the scope of the invention is not limited to any of the details shown, but instead includes such modifications and embodiments of the broad idea as fall within the scope of the subjoined claims.

Having thus described our invention, what we claim is:

1. A blank for forming a steering wheel comprising a plurality of elongated spoke portions and an elongated rim portion integral with each spoke portion, said rim portions being offset with respect to their spoke portions.

2. A blank for forming a steering wheel insert, comprising a band portion, mitered portions integral with said band portion at one edge thereof, and hub portions integral with said mitered portions and of increased width at their outer ends.

3. A blank for forming a steering wheel insert, comprising a substantially flat sheet metal stamping having a band portion, hub portions integral with said band portion at one edge thereof, spoke portions integral with said band portion at the other edge thereof, and rim portions integral with said spoke portions, said rim portions being offset with respect to the hub portions.

4. A blank for forming a steering wheel insert comprising a substantially flat sheet metal stamping having a band portion, spoke portions projecting at one edge of said band portion, rim portions extending from the ends of said spoke portions, and hub portions projecting from the other end of said band portion, certain of said hub portions being wider than the balance of said hub portions.

5. A blank for forming a steering wheel insert comprising a substantially flat sheet metal stamping having a band portion, spoke portions projecting at one edge of said band portion, and hub portions projecting from the other edge of said band portion, the hub portions adjacent the ends of said band having tabs projecting from one of their edges, said tabs being adapted to be bent inwardly to provide the wheel with an integral key.

6. The method of forming a steering wheel insert which consists in stamping out a sheet metal blank having spoke portions and rim portions integrally connected at one end thereof with the spoke portions, folding said rim portions with respect to their spoke portions and connecting the free end of each rim portion with the integrally connected end portion of an adjacent rim portion.

7. The method of forming a steering wheel insert which consists in stamping out sheet metal spoke portions and rim portions integral therewith and offset with respect thereto, folding said rim portions at said offset, and curving and connecting said rim portions.

8. The method of forming a steering wheel insert, which consists in stamping out a plurality of substantially parallel sheet metal strips integrally connected at one end thereof, folding said strips intermediate their ends to divide them into spoke portions and rim portions, curving said rim portions and connecting said rim portions to form a circle.

9. The method of forming a steering wheel insert, which consists in cutting out a sheet metal blank to form a transverse band portion with integral strips extending from one edge thereof, folding said strips to divide them into spoke portions and rim portions, rolling said band into the form of a tube, and forming said rim portions into a circle.

10. The method of forming an insert for a steering wheel which consists in cutting a sheet metal blank to form a transverse band portion with integral strips extending laterally from one edge thereof, folding said strips respectively intermediate their ends to direct the outer portions thereof at an angle to the inner portions, folding said band at an angle to the plane of said inner portions, rolling said band into a tube, and connecting the end of each outer portion to the intermediate fold of the adjacent strip.

11. The method of forming an insert for a steering wheel which consists in cutting a sheet metal blank to form a transverse band portion and integral strips extending laterally from one edge thereof, folding said strips respectively intermediate their ends to direct the outer portions thereof at an angle to the inner portions, folding said band at an angle to the plane of said inner portions, rolling said band into a tube, and forming said outer portions into a circular element.

12. The method of forming an insert for a steering wheel which consists in stamping out a sheet metal blank to form a band portion, spoke portions on one side of said band portion, rim portions extending from said spoke portions and shorter projections on the other edge of said band, folding the blank between the spoke portions and said band portion, rolling the stamped blank into the form of a tube and connecting each rim portion to the adjacent spoke.

13. The method of forming a steering wheel insert, which consists in cutting out a sheet metal blank to form a transverse band portion with integral strips extending from one edge thereof and shorter projections from the other edge thereof, folding said strips to divide them into spoke portions and rim portions, offsetting said shorter projections, rolling said band into the form of a tube, forming said projections into a cone, and forming said rim portions into a circle.

14. The method of forming an insert for a steering wheel, which consists in stamping out a sheet metal blank to form a band portion, spoke portions projecting from one edge of said band portion, rim portions extending from said spoke portions, mitered portions projecting from the other side of said band portion, and hub portions extending from said mitered portions, folding said rim portions with respect to said spoke portions, offsetting said hub portions with respect to said band portion thereby disposing said mitered portions substantially perpendicular to said band portion, rolling said band portion into the form of a tube by bringing its ends together, bringing said mitered portions into abutting relation to form a radial flange, rolling said hub portions to form them into a hub, and connecting said rim portions to bring them into a circular formation.

15. The method of forming an insert for a steering wheel, which consists in stamping out a sheet metal blank to form a band portion, spoke portions projecting from one edge of said band portion, rim portions extending from said spoke portions, mitered portions projecting from the other side of said band portion, and hub portions extending from said mitered portions, folding said rim portions with respect to said spoke portions, offsetting said hub portions with respect to said band portion thereby disposing said mitered portions substantially perpendicular to said band portion, rolling said band portion into the form of a tube by bringing its ends together, bringing said mitered portions into abutting relation to form a radial flange, fitting a collar around said hub portions, rolling said hub portions and said collar to form them into a hub, and connecting said rim portions to bring them into a circular formation, fitting a top plate over said band and radial flange and inside said band, pressing a lower cover plate up over the outside of said band and securing said lower plate to said top plate.

16. The method of forming the spokes and rim of a steering wheel insert, which consists in stamping strips from sheet metal, folding the strips to form therefrom spoke portions having rim portions at substantially right angles thereto, folding the ends of the rim portions, and inserting said folded ends in the pockets formed in the next adjacent strips by the first mentioned folds.

17. A blank for forming a steering wheel insert comprising a band portion, spoke portions projecting at one edge of said band portion, and rim portions extending from the ends of said spoke portions, said rim portions being offset from said spoke portions, said portions being so arranged that a second blank may be cut with its spoke and rim portions cut from the metal left with the stock sheet from between the spoke and rim portions of the first mentioned blank.

18. The method of forming the rim of a steering wheel insert from a blank having spoke portions and rim portions integral with the ends of the spoke portions, which comprises folding said blank between the rim portions and spoke portions to dispose the rim portion adjacent the fold transversely with respect to the spoke portion adjacent the fold, shaping the free ends of said spoke portions for interfitting engagement with the folds, and curving said rim portions to form a circular rim.

19. The method of forming a steering wheel insert, which comprises forming a sheet metal blank having a cup portion, spoke portions extending integrally from the rim of said cup portion, and rim portions integral with the ends of said spoke portions and out of alignment therewith, folding said blank between the rim portions and the spoke portions to dispose the same substantially at right angles to each other, and curving said rim portions to form a circular rim.

In testimony whereof, we hereunto affix our signatures.

BUDD BRONSON.
EDWARD R. MARBACH.